United States Patent [19]

Schröder

[11] Patent Number: 4,844,762
[45] Date of Patent: Jul. 4, 1989

[54] PROCESS FOR CONTINUOUSLY SHEATHING SOLID OR HOLLOW PROFILES WITH AN EXTRUDED FOAM JACKET OF THERMOPLASTIC SYNTHETIC RESIN

[75] Inventor: Ralph Schröder, Eupen, Belgium

[73] Assignee: Noel, Marquet & Cie. S.A., Eupen, Belgium

[21] Appl. No.: 146,091

[22] Filed: Jan. 20, 1988

[30] Foreign Application Priority Data

Jan. 29, 1987 [DE] Fed. Rep. of Germany ....... 3702585

[51] Int. Cl.$^4$ ............................................. B32B 31/00
[52] U.S. Cl. ................................. 156/244.12; 156/54; 156/244.13; 156/244.18; 156/244.27; 156/259; 156/294; 264/146
[58] Field of Search ...................... 156/244.18, 244.24, 156/244.11, 259, 294, 309.9, 308.4, 244.12, 244.13, 54, 203, 244.14, 143, 244.27; 138/128, 151, 170, DIG. 9; 29/728; 264/46.1, 146, DIG. 14

[56] References Cited

U.S. PATENT DOCUMENTS

| | | | |
|---|---|---|---|
| 1,405,998 | 2/1922 | Gammeter | 264/146 |
| 2,195,046 | 3/1940 | Best | 156/294 X |
| 3,903,233 | 9/1975 | Dougherty | 156/244.12 X |
| 4,201,607 | 5/1980 | Rautenberg et al. | 156/259 X |
| 4,322,260 | 3/1982 | Conlon | 156/244.12 |
| 4,713,271 | 12/1987 | Searl et al. | 138/151 X |

Primary Examiner—Robert A. Dawson
Assistant Examiner—David W. Herb
Attorney, Agent, or Firm—Larson and Taylor

[57] ABSTRACT

A process and an apparatus for continuously sheathing solid or hollow profiles (1), especially tubes, with an extruded foam jacket (3) of thermoplastic synthetic resin is provided. To this end a foam jacket is extruded, slit open, and into the slit foam jacket (3) the solid or hollow profile (1) to be sheathed is continuously coaxially introduced at synchronous speed. The slit foam jacket is closed by welding after the introduction. The process steps of slitting the foam jacket, introducing the profile to be sheathed into the foam jacket, and closing the foam jacket (3) by welding are to be carried out at temperatures of the foam jacket above the glass transition temperature of the synthetic resin material of the foam jacket. After the slit in the foam jacket (3) has been closed by welding, the jacket cools down and snugly shrinks onto the profile to be sheathed. According to a further embodiment said foam jacket (3) can be additionally provided with a protective film skin (5) extruded thereon in order to thus increase the impact resistance, the scratch resistance, and the water vapor impermeability of the foam jacket (3).

9 Claims, 3 Drawing Sheets

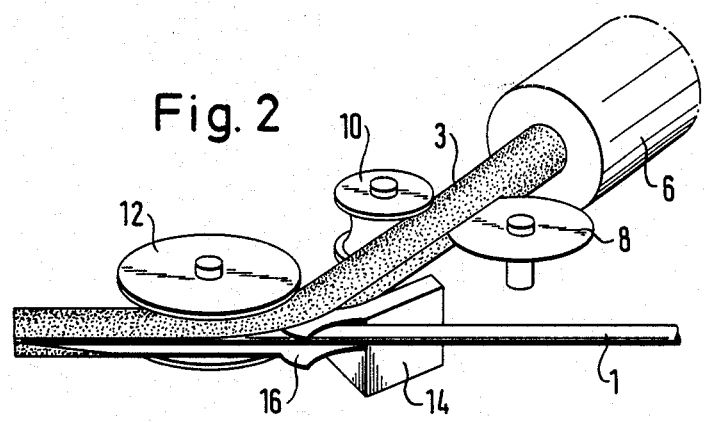
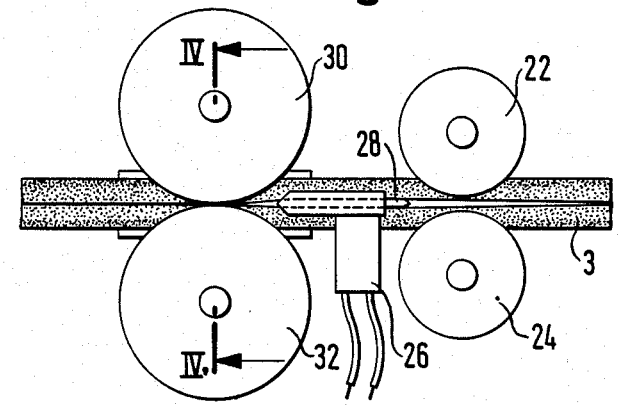
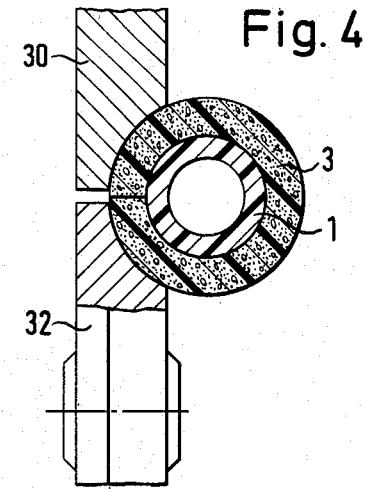

PROCESS FOR CONTINUOUSLY SHEATHING SOLID OR HOLLOW PROFILES WITH AN EXTRUDED FOAM JACKET OF THERMOPLASTIC SYNTHETIC RESIN

FIELD OF THE INVENTION

The present invention relates to a process and an apparatus for continuously sheathing solid or hollow profiles, especially tubes, with an extruded foam jacket, and the products thereby produced.

BACKGROUND OF THE INVENTION

In the construction of heating and cooling systems and the conduits required for these purposes it is necessary to have fully insulated tubes for the heating or cooling medium available in order to avoid high labor costs incurred by manual insulation of the tubes. This primarily applies to tubes having a small external diameter since manual insulation appears reasonable only for tubes having an external diameter of at least 20 to 25 mm or more.

On principle, the problem of continuous tube insulation for the manufacture of a pre-insulated tube has already been solved in that, for example, an endless strip of soft pre-fabricated foam is wound about the tube and is welded together along the abutting longitudinal sides. However, this process has several disadvantages. In the first place, difficulties arise in this process if the tube is to be sheathed in a foam jacket of larger diameter. Moreover, this process does not warrant firm adhesion of the foam jacket to the tube, so that a space remains between the tube itself and the thermal insulation sheath, which not only detracts from the thermal insulation properties but also facilitates the formation of perspiration water with the ensuring corrosion problems. Moreover, the process still requires two different processing steps, namely the production of the foam strip and the application of said foam strip on the tube.

However, also pre-insulated tubing is available on the market which is provided from the first with a foam jacket of thermoplastic material closed on all sides. The technology used for this purpose is based on coextrusion of a foamable thermoplastic material onto a metal tube by means of an extruder provided with an extruder head. With this process, however, no low density foam jacket is obtained with insulating properties meeting the most rigid standards. Since upon the emergence of molten material from the extruder die not only the external diameter but also the internal diameter of the extrudate increases, it is extraordinarily difficult to attain good adhesion of the foam jacket to the tube. In order to circumvent this problem in said known process it is necessary to limit the radial expansion of the foam jacket in the external direction with the result that the synthetic resin foam, which cannot freely expand, cannot reach the desired low density.

A pre-insulated tube is to have substantially the following properties:

(1) It should warrant excellent mechanical protection of the tube strand, be it of metal or plastic material, against shock, abrasion and crushing;

(2) an excellent thermal insulation coefficient meeting the most rigid standards;

(3) perfect adhesion of the foam jacket to the tube in order to avoid any free space between the foam jacket and the tube itself, especially in view of the formation of perspiration water and the ensuing corrosion problems;

(4) virtually complete imperviousness of the thermally insulating jacket to water vapor.

(5) The foam jacket should be soft and flexible, especially for metal tubes made of copper, in order to permit unproblematic laying and winding on reels.

SUMMARY OF THE INVENTION

Therefore, it is the object of the present invention to provide a process and an apparatus for sheathing not only tubes in the sense of the preceding statements but, in general, also other solid and hollow profiles, such as wire, electrical cables or optical waveguides assembled from respective glass fiber bundles.

According to the present invention, this object is realized in that (a) in a manner known per se a foam jacket (3) of thermoplastic synthetic resin is extruded as a hollow foam profile having an internal diameter of an internal configuration, after complete foaming and still hot from extrusion and prior to commencement of shrinkage, corresponding substantially to the external diameter or the external configuration of the solid or hollow profile (1) to be sheathed, (b) the foam jacket (3) is longitudinally slit shortly after complete foaming and while still hot, and the slit is opened in accordance with the dimensions of the solid or hollow profile (1) to be sheathed, (c) the solid or hollow profile (1) to be sheathed is introduced at synchronous speed coaxially into the opened foam jacket (3) before the extruded foam jacket (3) undergoes substantial shrinkage upon cooling, and (d) the opened foam jacket (3) is closed by hot welding immediately after the introduction of the solid or hollow profile (1) to be sheathed said welding being effected with additional heating of the cut faces of the slit and with subsequent compression of the cut faces.

It has found that the foam jacket, when emerging from the extruder, undergoes substantial shrinkage caused by cooling, both regarding the internal and the external diameter. Said shrinkage can amount up to 20%, compared with the dimensions upon maximum expansion. The process of the invention profits from this shrinkage which effects snug adherence of the foam jacket to the tube.

In order to introduce the solid or hollow profile into the foam jacket it is advisable to deflect the path of the foam jacket leaving the extruder die. The solid or hollow profile to be sheathed then meets the thus formed curve and is introduced along a straight line coaxially into the opened foam jacket. However, if the solid or hollow profile to be sheathed likewise consists of flexible material, it can also be bent, and at the same time the foam jacket can be so guided that it intersects with the path of the solid or hollow profile at the latter's point of curvature.

The process of the invention can thus be used, for example, for sheathing metal piping, preferably copper piping, as well as plastic piping. The tubes may be wound off a reel, continuously sheathed, and rewound onto a storage reel at the end of the process. If tubes or other non-flexible profiles are to be sheathed this can be done by connecting, for example, tubes of a 30 m length by means of suitable connecting sockets, and continuously passing them through the sheathing apparatus. After sheathing the "continuous tubes or profiles" are severed by cutting the connecting sockets apart. Instead of the sockets also suitable plug connections can be used; in case of tubes they may have the form of a plastic rod which is divided into three regions, namely the two end portions and the center portion. The two end portions have a diameter corresponding to the internal diameter of the tube, and the center portion corresponds to the external diameter of the tube.

Among the thermoplastic synthetic resins used according to the invention low density polyethylene is preferred. Of course, also all the other thermoplastic materials suited for the purposes of the invention may be employed, e.g. polypropylene, polystyrene, and copolymeres, and for special purposes also butadiene/styrene block copolymers, e.g. those known by the designation "Thermo-Rubber". However, as mentioned before, the solid or hollow profiles are sheathed especially with low density polyethylene, and the extrusion of the foam jacket is controlled so that the latter preferably has a volume weight of about 35 kg/m$^3$, especially of 30 kg/m$^3$ and less.

In the process of the invention the primarily preferred foaming agents are those that are normally gaseous, but liquid under pressure. The preferred foaming agents, especially in combination with polyethylene, are the halogen derivatives of methane and ethane, especially those available by the tradenames "Frigen". In lieu of said halogenated hydrocarbons also pure hydrocarbons can be advantageously employed as foaming agents, such as the various pentanes and butanes and other hydrocarbons and mixtures thereof.

Such foaming agents are added to the synthetic resin melt generally in an amount of 15 to 25% by weight, preferably 20% by weight, based on the synthetic resin melt.

In the operation of the process of the invention it is advisable to carry out the steps of extruding the foam jacket, slitting the foam jacket and introducing the solid or hollow length of material as rapidly as possible on the extruded foam jacket in order that the shrinkage phenomenon can be maximally utilized after cooling.

After sheathing of the solid or hollow profile with the foam jacket a further homogeneous protective film skin is extruded onto the synthetic resin jacket. To this end the solid or hollow profile sheathed with the foam jacket, which has just passed through the welding process, is passed through an additional extruder with extruder head; the procedure is such that the extruded protective film skin is preferably welded to the foam jacket whereby the impact resistance, the scratch resistance, and the water vapor impermeability of the foam jacket is increased.

In order to carry out the process of the invention there is used, according to the present invention, an apparatus characterized in that it consists substantially of (a) an extruder 2 known per se for producing a foam jacket 3 of thermoplastic synthetic resin, (b) a cutter means 8 with guide roll 10, (c) a deflecting means 12 with slit opening means 14, 16 which at the same time serve to guide the solid or hollow profile 1 to be introduced into the opened foam jacket 3, (d) a supply means 18 for supporting or accommodating the solid or hollow profiles 1 which are continuously fed to the slit foam jacket 3, (e) a first conveyor means 20 which may also serve to align the solid or hollow profiles 1 to be sheathed, if occasion arises, and (f) a welding means consisting of slit closing rolls 22, 24, a heating means 26 with wedge 28, and compressing rolls 30, 32.

The solid or hollow profile to be sheathed is preferably wound off a supply reel, since the process of the invention is contemplated especially for solid or hollow profiles capable of being wound on reels, and is wound on a storage reel after sheathing with foam.

Since, according to a preferred embodiment, the foam jacket is additionally provided with a protective film skin, there is preferably arranged downstream of the welding means an additional extruder with an extruder head for extruding the protective film skin in tubular form, optionally with an additional conveyor means.

In case the additional extruder is used for providing the foam jacket with a protective film skin it is further advisable to arrange a tunnel oven to facilitate welding of the foam jacket to the protective film skin.

For further reinforcement of the weld a roller assembly is arranged preferably downstream of the extruder to firmly press the extruded protective film skin onto the foam jacket. The roller assembly consists of a plurality of rollers mounted in star fashion to the supports and having a concave running surface, optionally with a multiplicity of annular grooves, and which are heatable, if desired.

BRIEF DESCRIPTION OF THE DRAWINGS

The present invention will be explained hereafter with reference to FIGS. 1 to 6 illustrating preferred embodiments thereof, but without limiting it thereto. All the details apparent from the figures, as far as they are not expressly mentioned in the description, are part of the disclosure of the present invention.

FIG. 2 shows in perspective view the emergence of the foam jacket from an extrusion die followed by cutting, slit opening, and deflecting means;

FIG. 3 shows in lateral plan view the welding means arranged downstream of the deflecting means and the means for introducing the solid or hollow profile into the slit foam jacket;

FIG. 4 shows along the cutting line IV—IV a cross section through a tube sheathed with the foam jacket in which the preheated slit cutting faces of the slit in the foam jacket are pressed together by the semi-concave running surfaces of the compressing rolls;

DETAILED DESCRIPTION OF THE PREFERRED EMBODIMENTS

Figure 1:
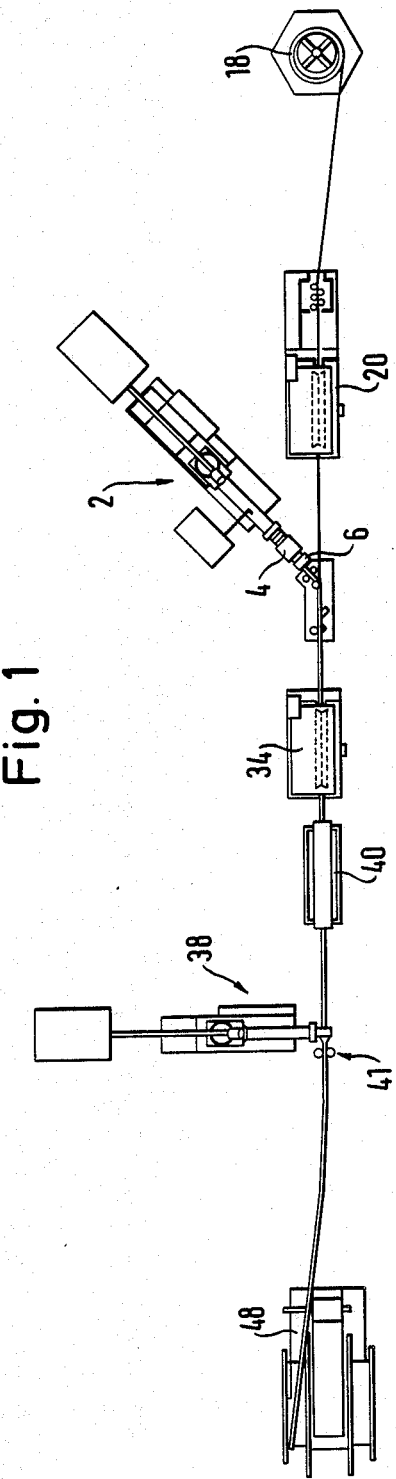
FIG. 1 schematically shows in a block diagram a preferred embodiment of the apparatus employed according to the invention.
Figure 5:
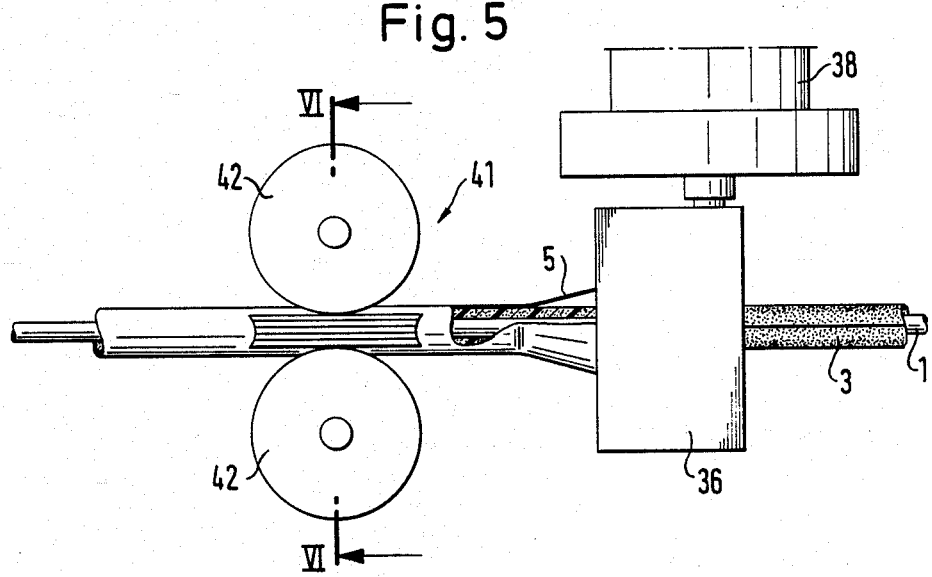
FIG. 5 schematically shows in a lateral view an additional extruder with extruder head and roller assembly for the extrusion of a protective film skin onto the foam jacket.
Figure 6:
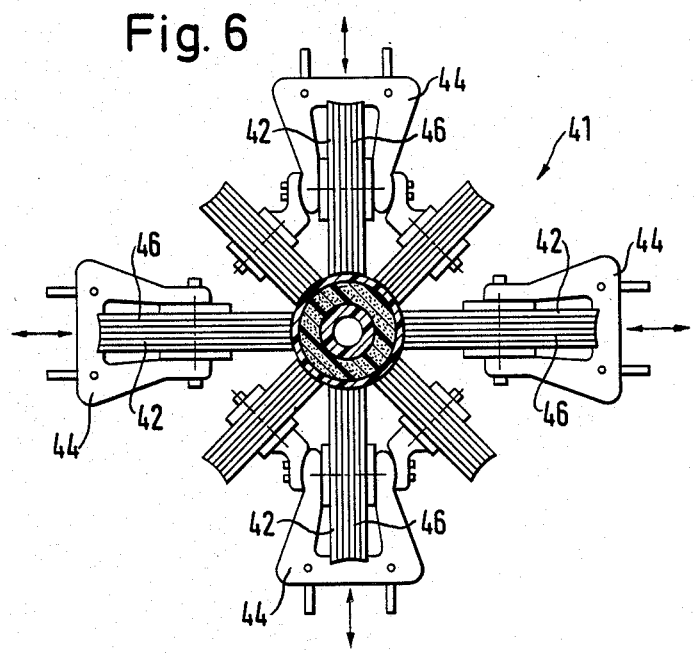
FIG. 6 is a plan view along the conveyor means showing the arrangement of the rollers of the roller assembly in star fashion along the line VI—VI shown in FIG. 5.

In the FIGS. 1 to 6 the reference numerals have the following meanings:
1 solid or hollow profile to be sheathed, also referred to as a length of material to be sheathed
2 extruder for foam jacket 3
3 foam jacket
4 mixer/cooler means 5 protective film skin
6 extrusion tool with extruder head
8 cutter means
10 guide roll
12 deflecting means (e.g. deflecting roll)
14,16 slit opening and guide means
18 supply means
20 first conveyor means serving optionally also for aligning the profiles 1 to be sheathed
22,24 slit closing rolls
26 heating means
28 wedge
30,32 compressing rolls
34 second conveyor means
36 extruder crosshead
38 extruder for protective film skin
40 tunnel oven
41 roller assembly
42 rollers of roller assembly 41
44 support for rollers 42
46 grooves in the running faces of rollers 42
48 collecting reel The extruder 2 illustrated in FIG. 1 represents a known extruder for thermoplastic synthetic resin melts which is provided with a mixer/cooler means 4 and is equipped with an extruder head 6 with annular opening for extrusion of the foamable thermoplastic synthetic resin melt (together with the foaming agent which is fed into the extruder barrel).

As mixer/cooler means the apparatus described in British Pat. No. 2,056,358 may be employed because it is necessary to cool and thoroughly blend the synthetic resin melt, including the foaming agent, prior to extrusion. The synthetic resin melt freely expands in the atmosphere after having left the extruder head thereby forming a foam jacket 3 of annular cross section or a cross section corresponding to the external profile of the solid or hollow profile 1 (also referred to as a length of material). As soon as the foam jacket 3 has left the extruder head and has assumed a relatively stable external shape, while still having a temperature higher than, or within the range of, the glass transition temperature, it is provided with a longitudinal slit by a cutter means 8 (cutter disk). Preferably the course of travel of the foam jacket 3 is now deflected by the rollers 10 and 12 whose concave running surfaces guide the foam jacket 3, and by means or a slit opener 14, 16 all of which are arranged as close as possible to the extrusion orifice. With part 16 the slit opener 14, 16 causes the slit made by the cutter 8 to spread open. Moreover, said slit opener 14, 16, in combination with the guide roll 10 and the deflecting roll 12, effects the deflection of the foam jacket 3 and at the same time serves as a support and guide of a solid or hollow profile 1, e.g. a tube, which is inserted into the foam jacket 3. The tube is wound preferably off a supply reel 18 by way of a conveyor 20 and is introduced into the foam jacket 3 through the opened slit.

In order to obtain optimum results, the external dimension of the tube should be such that it can be introduced into the foam jacket 3 coaxially relative to the foam jacket 3 with little clearance with respect to the latter's internal diameter.

The dimension of the extruder head therefore preferably meets this requirement. Downstream of the deflecting roll 12 two slit closing rolls 22, 24 are arranged by which the foam jacket 3 with the tube is passed, and the pressure exerted by the slit closing rolls onto the foam jacket 3 takes care that the slit in the foam jacket is pressed together. The slit cutting faces are heated, for example by contact with a heating means 26 provided with a wedge 28, and are thereafter closed again by the compression rolls 30, 32 which exert light pressure on the foam jacket 3. By the concave shape of the compression rolls 30, 32 on one side of their surface the cut faces are progressively converged (see FIG. 4). Preferably a second conveyor means 34 consisting, for example, of two endless conveyor belts guiding the foam jacket 3 from opposite sides transports the sheathed tube.

As mentioned before, in a preferred embodiment of the process of the invention a protective film skin 5 is extruded onto the foam jacket 3, said skin 5 consisting preferably of the same synthetic resin as the foam jacket 3. In this process the insulated tube is passed through an extruder crosshead 36 provided at a further extruder 38. Preferably the sheathed tube is passed through a tunnel oven 40 before being introduced into the second extruder 38 in order to heat up the surface of the foam jacket 3 so as to ensure perfect welding to the protective film skin 5 subsequently extruded thereon. The extruder crosshead 36 has an annular orifice directed radially towards the tube and extruding the synthetic resin radially onto the tube in tubular form.

For especially firm bond between the protective film skin and the foam jacket 3 the structure resulting after extrusion of the protective film skin 5 is guided through a roller assembly 41. Said roller assembly consists of a multiplicity of rollers 42 mounted on a support 44 in star fashion. Each roller has a concave running face with a radius of curvature matching that of the foam jacket 3. Moreover, the running surfaces of the rollers may have a multiplicity of annular grooves 46. Each roller 42 bears with its running surface against the protective film skin 5, and thus against the foam jacket 3, so that the desired firm weld is attained. If the roller asembly 41 is provided directly downstream of the extruder crosshead 36, the film can be welded onto the foam jacket 3 in longitudinal lanes without the need of supplying additional heat. Of course, it is also possible to provide additional heat in that each roll 42 is provided with a heating system so that the contact surface temperature of the rollers 42 is heated to the temperature required for the welding operation.

The tube sheathed in this manner can then be immediately wound helically onto a collecting reel 48. The distance between the windup machine and the extruder crosshead 36 at the extruder 38 should be sufficient to allow natural cooling.

I claim:
1. A process for continuously sheathing solid or hollow lengths of material with an extruded foam jacket of thermoplastic synthetic resin, said process comprising the steps of:
(a) extruding a foam jacket of thermoplastic synthetic resin as a hollow foam profile, after complete foaming and while still hot from extrusion and prior to commencement of shrinkage, having an internal configuration corresponding substantially to the external configuration of the solid or hollow length of material to be sheathed,
(b) slitting the foam jacket longitudinally shortly after complete foaming and while still hot, the slit being opened in accordance with the dimensions of the solid or hollow length of material to be sheathed,

(c) introducing the solid or hollow length of material to be sheathed coaxially into the opened foam jacket before the extruded foam jacket undergoes substantial shrinkage upon cooling, and (d) closing the opened foam jacket by hot welding immediately after the introduction of the solid or hollow length of material to be sheathed, said welding being effected with additional heating of the cut faces of the slit and with subsequent compression of the cut faces.

2. Process according to claim 1, characterized in that the process steps (b) to (d) are carried out at temperatures above the glass transition temperature of the foamed thermoplastic synthetic jacket.

3. Process according to claim 1, characterized in that the extruded and longitudinally slit foam jacket (3) is deflected, and the slit is opened, at such a radius of curvature that the solid or hollow length of material to be sheathed can be introduced coaxially into the opened foam jacket (3).

4. Process according to claim 1, characterized in that, after welding of the foam jacket (3) an external homogeneous protective film skin (5) of thermoplastic synthetic resin is extruded onto the weld-closed synthetic resin foam jacket (3) by means of an extruder crosshead (36) of an additional extruder (38) provided with an annular die.

5. Process according to claim 4, characterized in that the protective film skin (5) is additionally welded in longitudinal lanes to the weld-closed foam jacket (3).

6. Process according to claim 1, characterized in that for the foam jacket (3) and for the protective film skin (5) the same thermoplastic synthetic resin is employed.

7. A process according to claim 1, wherein the thermoplastic synthetic resin of the foam jacket is a polyolefin, having a volume weight of no more than 35 kg/m$^3$.

8. A process according to claim 7, wherein the polyolefin is a low density polyethylene.

9. A process according to claim 8, wherein the low density polyethylene has a volume weight of no more than 25 kg/m$^3$.

* * * * *